US012634606B2

(12) United States Patent
Ghobadi et al.

(10) Patent No.: US 12,634,606 B2
(45) Date of Patent: May 19, 2026

(54) IN-NETWORK OPTICAL INFERENCE

(71) Applicants:Massachusetts Institute of Technology, Cambridge, MA (US); NTT Research, Incorporated, Sunnyvale, CA (US)

(72) Inventors: Manya Ghobadi, Cambridge, MA (US); Zhizhen Zhong, Cambridge, MA (US); Weiyang Wang, Cambridge, MA (US); Liane Sarah Beland Bernstein, Cambridge, MA (US); Alexander Sludds, Cambridge, MA (US); Ryan Hamerly, Cambridge, MA (US); Dirk Robert Englund, Brookline, MA (US)

(73) Assignees: Massachusetts Institute of Technology, Cambridge, MA (US); NTT Research, Incorporated, Sunnyvale, CA (US)

( * ) Notice: Subject to any disclaimer, the term of this patent is extended or adjusted under 35 U.S.C. 154(b) by 300 days.

(21) Appl. No.: 18/561,985

(22) PCT Filed: May 20, 2022

(86) PCT No.: PCT/US2022/030254
§ 371 (c)(1),
(2) Date: Nov. 17, 2023

(87) PCT Pub. No.: WO2022/246197
PCT Pub. Date: Nov. 24, 2022

(65) Prior Publication Data
US 2024/0244354 A1     Jul. 18, 2024

Related U.S. Application Data

(60) Provisional application No. 63/191,120, filed on May 20, 2021.

(51) Int. Cl.
| | | |
|---|---|---|
| *H04Q 11/00* | (2006.01) | |
| *G06N 5/04* | (2023.01) | |
| *H04B 10/524* | (2013.01) | |

(52) U.S. Cl.
CPC ........... *H04Q 11/0005* (2013.01); *G06N 5/04* (2013.01); *H04B 10/524* (2013.01); *H04Q 2011/0039* (2013.01); *H04Q 2011/0041* (2013.01)

(58) Field of Classification Search
CPC ....... H04Q 11/0005; H04Q 2011/0039; H04Q 2011/0041; H04B 10/524; G06N 5/04
(Continued)

(56) References Cited

U.S. PATENT DOCUMENTS

| | | | |
|---|---|---|---|
| 11,604,978 B2 | 3/2023 | Hamerly et al. | |
| 12,020,150 B2 * | 6/2024 | Guo ........................ | G06N 3/084 |

(Continued)

OTHER PUBLICATIONS

Agrawal et al., "Intel Tofino2—A 12.9 Tbps P4-Programmable Ethernet Switch." 2020 IEEE Hot Chips 32 Symposium (HCS). IEEE Computer Society, 2020, 32 pages.
(Continued)

*Primary Examiner* — Dalzid E Singh
(74) *Attorney, Agent, or Firm* — Smith Baluch LLP

(57) ABSTRACT

In-network Optical Inference (IOI) provides low-latency machine learning inference by leveraging programmable switches and optical matrix multiplication. IOI uses a transceiver module, called a Neuro Transceiver, with an optical processor to perform linear operations, such as matrix multiplication, in the optical domain. IOI's transceiver modules can be plugged into programmable packet switches, which are programmed to perform non-linear activations in the electronic domain and to respond to inference queries. Processing inference queries at the programmable packet switches inside the network, without sending them to cloud
(Continued)

Inference Server can be located at the edge or in the cloud or edge inference servers, significantly reduces end-to-end inference latency experienced by users.

18 Claims, 9 Drawing Sheets

(58) Field of Classification Search
USPC ........................................................ 398/43
See application file for complete search history.

(56) References Cited

U.S. PATENT DOCUMENTS

| | | | |
|---|---|---|---|
| 12,033,065 B2 * | 7/2024 | Kenney | G06N 3/084 |
| 2019/0102672 A1 * | 4/2019 | Bifulco | G06N 3/04 |
| 2019/0317802 A1 | 10/2019 | Bachmutsky et al. | |
| 2020/0250534 A1 | 8/2020 | Shen et al. | |
| 2021/0064958 A1 * | 3/2021 | Lin | G02F 1/313 |
| 2021/0357737 A1 | 11/2021 | Hamerly et al. | |
| 2022/0180175 A1 | 6/2022 | Guo | |
| 2023/0274156 A1 * | 8/2023 | Hamerly | G06N 5/04 |
| | | | 706/25 |

OTHER PUBLICATIONS

Bansal et al., "Chauffeurnet: Learning to drive by imitating the best and synthesizing the worst." arXiv preprint arXiv:1812.03079 (2018), 20 pages.

Cheng et al., "Wide & deep learning for recommender systems." Proceedings of the 1st workshop on deep learning for recommender systems. 2016, 4 pages.

Gebara et al., "Challenging the Stateless Quo of Programmable Switches." Proceedings of the 19th ACM Workshop on Hot Topics in Networks. 2020, 7 pages.

Hamerly et al., "Large-scale optical neural networks based on photoelectric multiplication." Physical Review X 9.2 (2019): 021032, 12 pages.

Han et al., "A survey of label-noise representation learning: Past, present and future." arXiv preprint arXiv:2011.04406 (2020), 24 pages.

Han et al., "Deep compression: Compressing deep neural networks with pruning, trained quantization and huffman coding." arXiv preprint arXiv:1510.00149 (2015), 14 pages.

Han et al., "Deep compression: Compressing deep neural networks with pruning, trained quantization and huffman coding." international conference on learning representations (2015), 14 pages.

Iandola et al., "SqueezeNet: AlexNet-level accuracy with 50x fewer parameters and< 0.5 MB model size." arXiv preprint arXiv:1602.07360 (2016), 13 pages.

Intel Newsroom, Intel Demonstrates Industry-First Co-Packaged Optics Ethernet Switch. Mar. 5, 2020. Accessed at https://newsroom.intel.com/news/intel-demonstrates-industry-first-co-packaged-optics-ethernet-switch/#gs.2pcxw6. 4 pages.

International Search Report and Written Opinion in International Application No. PCT/US2022/030254 mailed Nov. 16, 2022, 11 pages.

Junos Trio Programmable Silicon Optimized for the Universal Edge. Juniper Networks Oct. 2009. 12 pages.

Karimi et al., "Deep learning with noisy labels: Exploring techniques and remedies in medical image analysis." Medical Image Analysis 65 (2020): 101759, 49 pages.

Kim, "Powered by ai: Oculus insight" Facebook AI, 2019. Accessed at https://ai.facebook.com/blog/powered-byai-oculus-insight/, 2019, 5 pages.

Kim, The scalable neural architecture behind alexa's ability to select skills. Amazon Science Jun. 7, 2018. Accessed at https://www.amazon.science/blog/the-scalable-neural-architecture-behind-alexas-ability-to-select-skills. 10 pages.

Naumov et al., "Deep learning recommendation model for personalization and recommendation systems." arXiv preprint arXiv:1906.00091 (2019), 10 pages.

Nvidia, Cloud, and Data Center. "Nvidia V100 Tensor Core GPU." Accessed at https://www.nvidia.com/en-us/data-center/a100/ on May 30, 2021. 9 pages.

Pandit et al., Modeling the impact of cpu properties to optimize and predict packet-processing performance. Intel Case Study 2018. Accessed at https://www.intel.com/content/dam/www/public/us/en/documents/case-studies/att-cpu-impact-on-packet-processing-perfomance-paper.pdf, 24 pages.

Siri Team. Hey siri: An on-device dnn-powered voice trigger for apple's personal assistant. Apple Machine Learning, Oct. 2017. Accessed at https://machinelearning.apple.com/research/hey-siri. 11 pages.

Wang et al., "Monolithic lithium niobate photonic circuits for Kerr frequency comb generation and modulation." Nature communications 10.1 (2019): 1-6.

Wetzstein et al., "Inference in artificial intelligence with deep optics and photonics." Nature 588.7836 (2020): 39-47.

Wu et al., "Machine learning at facebook: Understanding inference at the edge." 2019 IEEE International Symposium on High Performance Computer Architecture (HPCA). IEEE, 2019, pp. 331-344.

Xiong et al., "Do switches dream of machine learning? Toward in-network classification." Proceedings of the 18th ACM workshop on hot topics in networks. 2019, pp. 25-33.

* cited by examiner $$Y_m = \sum_{1 \leq i \leq N} X_i W_{m,i}$$

Wavelength multiplexing for vector-vector product $$Y_m = \sum_{1 \leq i \leq N} X_i W_{m,i}$$

Time multiplexing for vector-vector product

IN-NETWORK OPTICAL INFERENCE

CROSS-REFERENCE TO RELATED APPLICATION(S)

This application is a national-phase application, under 35 U.S.C. 371, of International Application No. PCT/US2022/030254, filed May 20, 2022, which in turn claims the priority benefit, under 35 U.S.C. 119(e), of U.S. Application No. 63/191,120, which was filed on May 20, 2021. Each of these applications is incorporated herein by reference in its entirety for all purposes.

GOVERNMENT SUPPORT

This invention was made with government support under HR0011-2-0-C0089 awarded by the Defense Advanced Research Projects Agency, and under DE-AR0000843 awarded by the U.S. Department of Energy. The government has certain rights in the invention.

BACKGROUND

Artificial Intelligence (AI) is reshaping society by empowering services such as self-driving vehicles (e.g., Waymo), smart personal assistants (e.g., Alexa, Siri), virtual/augmented reality (e.g., Oculus), and personalized recommendations. The success of AI-based services depends on the latency perceived by users of those services launching inference tasks to interact with the services. To maintain low latency, neural network models should be located as close as possible to the user, ideally on the user's device. However, to achieve high accuracy, today's services often use large Deep Neural Networks (DNNs) that are constantly updated with new datasets. Despite research efforts to reduce the size of DNN models, most of today's commercial applications still execute inference tasks in the cloud or on edge servers instead of local computation due to memory/power/computing limitations.

FIG. 1 illustrates execution of a typical cloud-based or edge-based machine learning inference task. In this example, inference data 13 (e.g., speech or imagery) generated by a user is sent from the user's device (e.g., a client computer, tablet, or smartphone) all the way to an inference server 100 via the internet 20 or another suitable packet-switched communications network. The inference data 13 follows a data path 21 via one or more packet switches 22a-22d to the inference server 100, which includes a network interface card 102, central processing unit (CPU) 104, memory 108, and graphics processing unit (GPU) 108, tensor processing unit (TPU), or other processor coupled to a bus 110 (e.g., a Peripheral Component Interconnect Express (PCIe) bus). The inference server 100 can be in the cloud or on the edge and uses the GPU 108 to host the DNN 15 or another suitable machine learning (ML) model. The inference server 100 receives the inference data 13 from the user 11 as an input to the DNN 15 and supplies the DNN's output to the user via a data path via the internet 20.

Inference processing on an inference server in the cloud or on the edge suffers from inference latency with two components besides the computation latency: (1) packet propagation delay on data paths from the user(s) to the inference server(s), and (2) packet queueing and processing delay at traversed switches and the end-host inference servers. The first latency component depends on the length of data path between the user(s) and the inference server; hence, the closer the server to the user(s), the lower the packet propagation delay. However, the second latency component depends on packet queueing and switching by the inference server's CPU. To ensure reliable delivery, a typical inference server relies on transmission control protocol (TCP) sockets and the host's CPU computing capabilities to process inference queries from the user(s). The CPU's speed, which is limited by its clock frequency, often limits the packet queueing and processing delay and hence the total inference latency. Given the clock frequency of today's CPUs (e.g., an Intel Xeon Gold 6152 processor with 44 cores), a CPU can process packets at about 5.2 million packets per second (PPS) per core or 220 million packets per second (PPS) in total.

SUMMARY

In-network optical inference (IOI) eliminates the step of sending data to a CPU for inference processing. Instead of performing the inference processing with a CPU or other server-based processor, IOI performs inference tasks inside programmable packet switches, such as the Intel Tofino 2 programmable Ethernet switch or Juniper Networks Junos Trio chipset. These switches can achieve 6 billion packets per second (PPS) packet processing throughput with maximum port bandwidth of 12.8 Tbps. This is 1000 times faster than a CPU core! Unfortunately, these switches do not have the correct application-specific integrated circuit (ASIC) for matrix multiplication. We address this shortcoming by using optical computing hardware to perform matrix multiplication. When combined with optical computing hardware for computation-intensive matrix multiplication, programmable packet switches can perform inference processing at higher speeds, lower power consumption, and lower cost than conventional server-based inference processors.

IOI can be carried out by transmitting a first data packet containing an input vector from a client to a programmable packet switch. The programmable packet switch concatenates a weight vector corresponding to a layer of neurons in an artificial neural network, such as a deep neural network (DNN), with the first data packet, then transmits the first data packet to an optical computing unit. (Before concatenating the weight to the first data packet, the programmable packet switch can remove source and/or destination metadata from the first data packet.) The optical computing unit computes a product of the input vector and the weight vector, then transmits a second data packet containing the product back to the programmable packet switch, which applies a nonlinear activation function to the product.

The optical computing unit can compute the product of the input vector and the weight vector by modulating, with a first modulator, an optical pulse with a waveform proportional to the input vector element; modulating, with a second modulator in optical communication with the first modulator, the optical pulse with a waveform proportional to the weight vector; and detecting the optical pulse with a photodetector. The optical computing unit can delay the optical pulse between the first modulator and the second modulator by a delay equal to a duration of the waveform proportional to the input vector element. Before transmitting the second data packet, the optical computing unit can digitize the product and store the (digitized) product in a memory.

The programmable packet switch can concatenate a weight vector corresponding to another layer of neurons in the artificial neural network with the output of the first layer, then transmit the output and weight vector back to the optical computing unit. It can apply the nonlinear activation function by retrieving information from a match-action table programmed into its memory.

IOI can also be carried by receiving, at a switch, a packet with a header comprising source/destination metadata and a payload comprising an input to a deep neural network (DNN). The switch removes the source/destination metadata from the header and adds a weight vector corresponding to a first layer of the DNN to the header. The switch transmits the packet to an optical processor comprising a first modulator, a second modulator in series with the first modulator, and a photodetector. A digital-to-analog converter converts the input to the DNN and the weight vector into first and second analog waveforms, respectively. The first and second modulators modulate an amplitude of an optical beam with the first and second analog waveforms, respectively. And the photodetector transduces the optical pulse into an electrical signal with an amplitude representing a product of the input to the DNN and the weight vector. The switch performs a nonlinear activation on the electrical signal to produce an output of the first layer of the DNN. If desired, the switch can send a packet containing the output of the first layer of the DNN and a weight vector corresponding to a second layer of the DNN to the header to the optical processor.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

DETAILED DESCRIPTION

In-network optical inference (IOI) combines the power of optical computing with programmable switches for highly efficient, line-rate neural computations. In IOI, the packet processing bottleneck induced by an inference server's CPU is lifted by high-throughput packet processing ASIC of network switches. IOI transforms the conventional protocol of user→network→inference server→network→user into a user→network→user protocol, significantly reducing the end-to-end inference latency. Matrix multiplication is done with specially designed transceiver ports in the optical domain, non-linear activation is done with programmable packet switches in the electrical domain, and multiple layers of the neural network are processed with scheduled recirculations with switch pipelines. A packet structure and a layer-3 protocol enable efficient communications and data transfer between users and IOI hardware.

Figure 1:
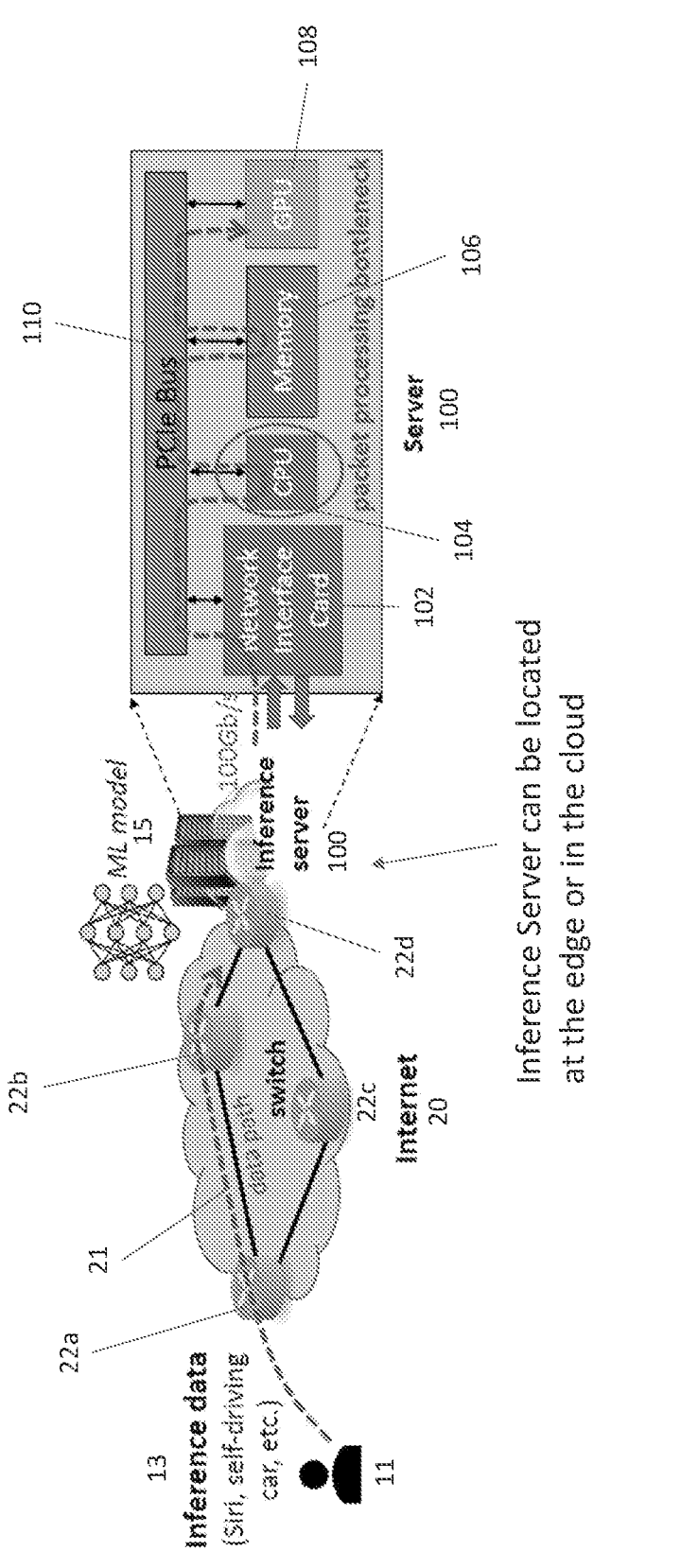
FIG. 1 illustrates cloud-based or edge-based machine learning inference on inference servers.
Figure 2:
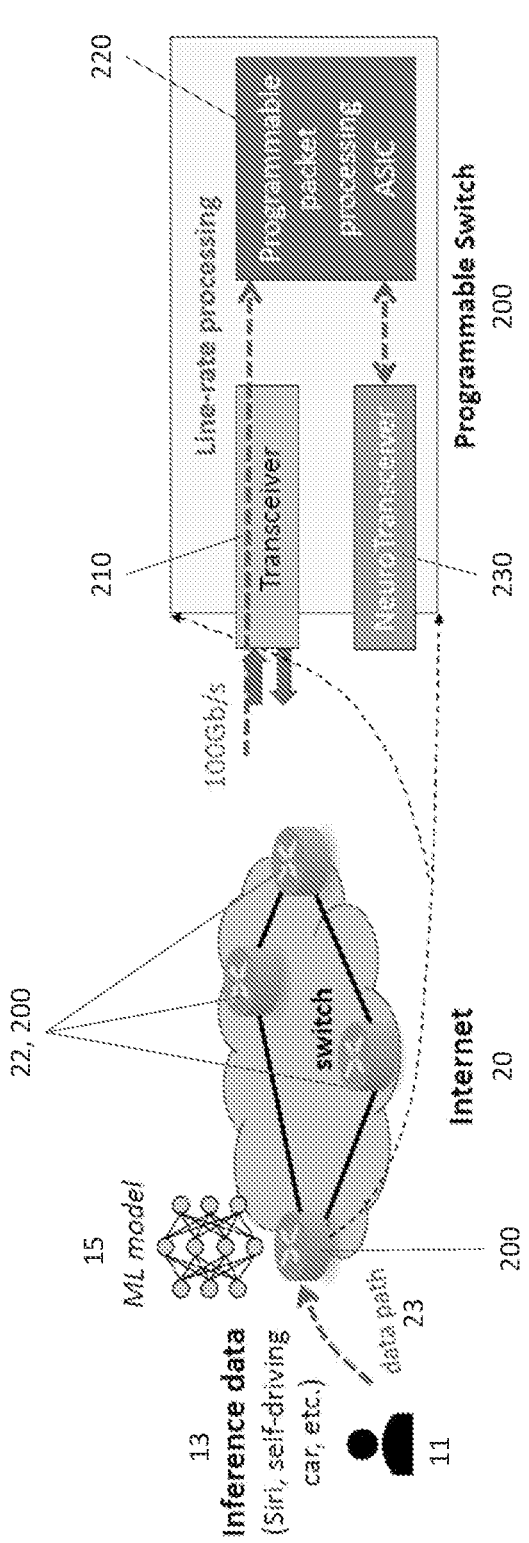
FIG. 2 illustrates In-network Optical Inference (IOI)-based machine learning inference on programmable switches.

FIG. 2 illustrates IOI processing with programmable packet switches 200, also called programmable switches 200, performing neural network inference at the line rate (e.g., 100 Gbps). As before, a user 11 generates inference data 13 and transmits it to a DNN 15 or other ML model for inference processing via the internet 20 or another packet-switched communications network. In IOI processing, however, the DNN 15 is hosted on a programmable switch 200 instead of on a separate inference server. This programmable switch 200 can be close to or connected directly to the user's client device or connected to the user's client device via one or more conventional switches 22. In either case, the data path 23 from the user's client device to the DNN 15 is much shorter than in the case with a conventional inference server (FIG. 1).

The user 11 sends inference data (e.g., a voice query from a personal assistant or an image from an autonomous navigation system) in the form of input data packets to the programmable switch 200, possibly via one or more conventional switches 22. Instead of forwarding the packet to a server for inference processing, the programmable switch 200 performs the inference processing itself at line-rate processing speeds (e.g., 100 Gb/s) using a fast transceiver 210, programmable packet processing chip (implemented here as an ASIC) 220, and specialized NeuroTransceiver 230. The programmable switch 200 also performs the packet switching and routing performed by conventional switches 22 and thus can take the place of a conventional switch 22 in the internet 20 or another packet-switched network. The NeuroTransceiver 230 can be implemented as a pluggable transceiver that can be plugged into the programmable switch 200 and is designed for optical matrix multiplication. It includes an optical computing unit, described below and shown in FIG. 3A, with analog-to-digital conversion (ADC), digital-to-analog conversion (DAC), and control logic for interfacing with the programmable packet processing chip 220.

In operation, the transceiver 210 receives input inference data packets, also called inference data packets or input data packets, from the client device and transmits output DNN data packets to the client device. The programmable packet processing switch ASIC 220 combines the inference data packets with the corresponding weights from the neural network model 15 and sends the packets to the NeuroTransceiver 230, which multiplies the inference data packets and the weights. The NeuroTransceiver 230 sends the products back to the programmable packet processing switch ASIC 220 for nonlinear activation, completing the computations for one layer of the neural network 15. At this point, the programmable packet processing switch ASIC 220 can update the packet to include weights for the next neural network layer and send the updated packet back to the NeuroTransceiver 230 for another round of processing for the next layer of the neural network 15. The NeuroTransceiver 230 and programmable packet processing switch ASIC 220 can update and exchange packets until they reach the output of the last neural network layer, at which point the programmable packet processing switch ASIC 220 and transceiver 210 send the output back to the user 11.

Using a programmable switch 200 to perform inference processing reduces the inference latency in at least three ways. First, it reduces the length of the data path 23 from the user 11 to the DNN 15. Instead of traversing several conventional switches 22 from the user's client device to an inference server in the cloud or on the compute edge, the inference data packets simply propagate to the closest available programmable switch 200, which can be very close to the user's client device. Second, the data path 23 may also include fewer switches 22, reducing the time associated with queueing and switching the data packets from and to the user's client device. Third, using a programmable switch 200 to perform inference processing eliminates the delay associated with using an interference server's CPU to route data to and from a GPU.

Figures 3A, 3B:
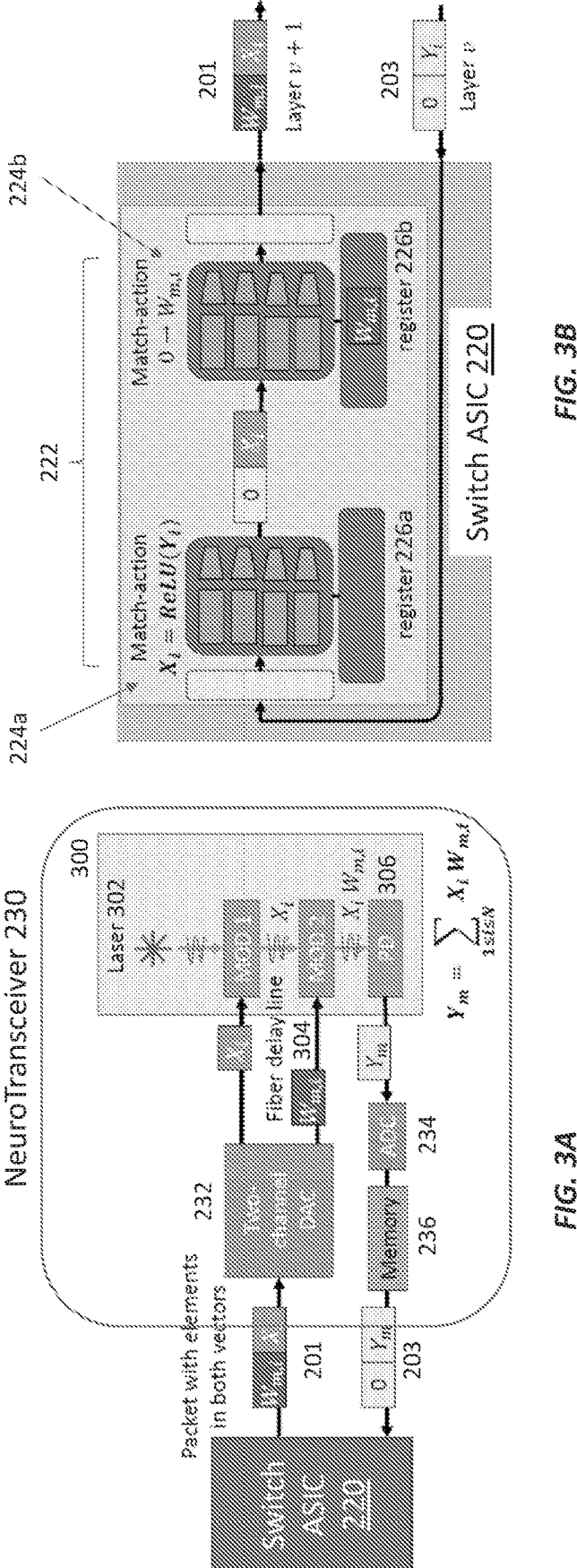
FIG. 3A illustrates a switch application-specific integrated circuit (ASIC) and NeuroTransceiver that compute an optical vector-vector product of an input vector element and a weight encapsulated in the same data packet.
FIG. 3B illustrates nonlinear activation of the optical vector-vector product from FIG. 3A in a switch ASIC.

FIG. 3A shows the NeuroTransceiver 230 in greater detail. The NeuroTransceiver 230 is coupled to the programmable packet processing chip 220 (e.g., an appropriately modified Intel Tofino ASIC switch) and includes an optical computing unit or optical processor in the form of optical neural network (ONN) hardware 300 for computing an optical vector-vector product as part of IOI processing. This ONN hardware 300 includes a pulsed laser 302, a first electro-optic amplitude modulator MOD 1, an optical delay line 304, a second electro-optic amplitude modulator MOD 2, and a photodetector 306. In this example, the ONN hardware 300 is fiber-coupled for ease of alignment and packaging, with the optical delay line 304 implemented as a fiber delay line that connects the output of the first modulator MOD 1 to the input of the second modulator MOD 2. The NeuroTransceiver also includes a two-channel digital-to-analog converter (DAC) 232, with the outputs of the first channel and second channel coupled to the first modulator MOD 1 and second modulator MOD 2, respectively. The output of the photodetector 306 is coupled to an analog-to-digital converter (ADC) 234, which is coupled in turn to a memory 236.

In operation, the programmable packet processing chip 220 sends data packets 201, also called Neuro-packets as explained below, with input vector elements (inference data) $x_i$ and corresponding neural-network weights $w_i$ to the ONN unit 300 for matrix multiplication. The input vector elements (inference data) $x_i$ and corresponding neural-network weights $w_i$ are directed to different channels of the two-channel DAC 232, which converts the digital values carried by the packets 201 into analog waveforms, still in the electrical domain, for driving the fiber-coupled, electro-optic amplitude modulators MOD 1 and MOD 2.

The first modulator MOD 1 modulates a laser beam from the laser 302 with the analog waveform representing the input vector element (inference data) $x_i$. The second modulator MOD 2 modulates this modulated pulse with the analog waveform representing the corresponding weight $w_{m,i}$. Modulation is a multiplicative process, so the first modulator MOD 1 multiplies the input vector element $x_i$ with the constant, continuous-wave laser beam (treated here as 1) to produce an output of $x_i$. The second modulator MOD 2 takes the output of the first modulator MOD 1 (i.e., $x_i$) as input and further multiplies it with the corresponding weight $w_{m,i}$ to produce a modulated pulse whose amplitude is equal to the product of $x_i$ and $w_{m,i}$. As explained in greater detail below, the optical delay line 304 connecting the first and second modulators MOD 1, 2 delays the modulated pulse so that it and the analog waveform representing the corresponding weight $w_i$ propagate through the second modulator simultaneously to produce an output pulse modulated by $y_m$, which is the product of $x_i$ and $w_{m,i}$.

The photodetector 306 coupled to the output of the second modulator MOD 1 transduces this modulated output pulse back into the electrical domain, where it is converted to a digital value by the ADC 234. The memory 236 coupled to the ADC 234 accumulates these digital values until the last product has been computed, at which point the NeuroTransceiver 230 sends the digital values stored in the memory 236 back to the programmable packet processing chip 220 in another packet 203 with a header that does not contain input information for inference (indicated by the 0 in FIG. 3A). The Together, the ONN unit 300, DAC 232, ADC 234, and memory 236 form the NeuroTransceiver 230. This NeuroTransceiver 230 can be implemented as an integrated component, with the ONN unit 300 integrated in a silicon photonic chip and the DAC 232, ADC 234, and memory 236 integrated on the same chip. The NeuroTransceiver 230 can plug directly into a port on the programmable packet switch 200.

FIG. 3B shows a two-stage pipeline 222 implemented inside the programmable packet processing chip 220 for recirculating packets 201, 203 to the NeuroTransceiver 230. By recirculating packets 201, 203, the programmable packet processing chip 220 and NeuroTransceiver 230 compute a series of neural network layers, one layer at a time. The programmable packet processing chip 220 receives packets from the NeuroTransceiver 230 representing the input vector elements $x_m$ to the neural network 15 or the outputs of a preceding neural network layer $y_m$. The first stage 224a of the pipeline 222 executes a nonlinear activation function, such as a rectified linear activation unit (ReLU) function, on the input according to a table stored in a register 224a of the programmable packet switch. This nonlinear activation transforms the output $y_m$ of layer v into the input $x_i$ of layer v+1.

The second stage 224b of the pipeline concatenates (e.g., appends or prepends) the weight $w_{m,i}$, which is stored in a second register 226b, for layer v+1 to the packet, which the programmable packet processing chip 220 sends to the ONN unit 300. In other words, the second stage 224b of the two-stage pipeline in FIG. 3B acts as a weight-pickup mechanism that encapsulates $x_i$ and $w_{m,i}$ into the same data packet 201. The register 226b stores the neural network weights $w_{m,i}$ for each layer of the neural network model 15. The packet structure is designed so that the programmable packet processing chip 220 can generate these concatenated inference data/weight packets 201 at the line rate for the high-speed DAC 232 in the NeuroTransceiver 230 as explained below with respect to FIG. 4B.

Optical Matrix Multiplication in IOI

Figures 3C, 3D:
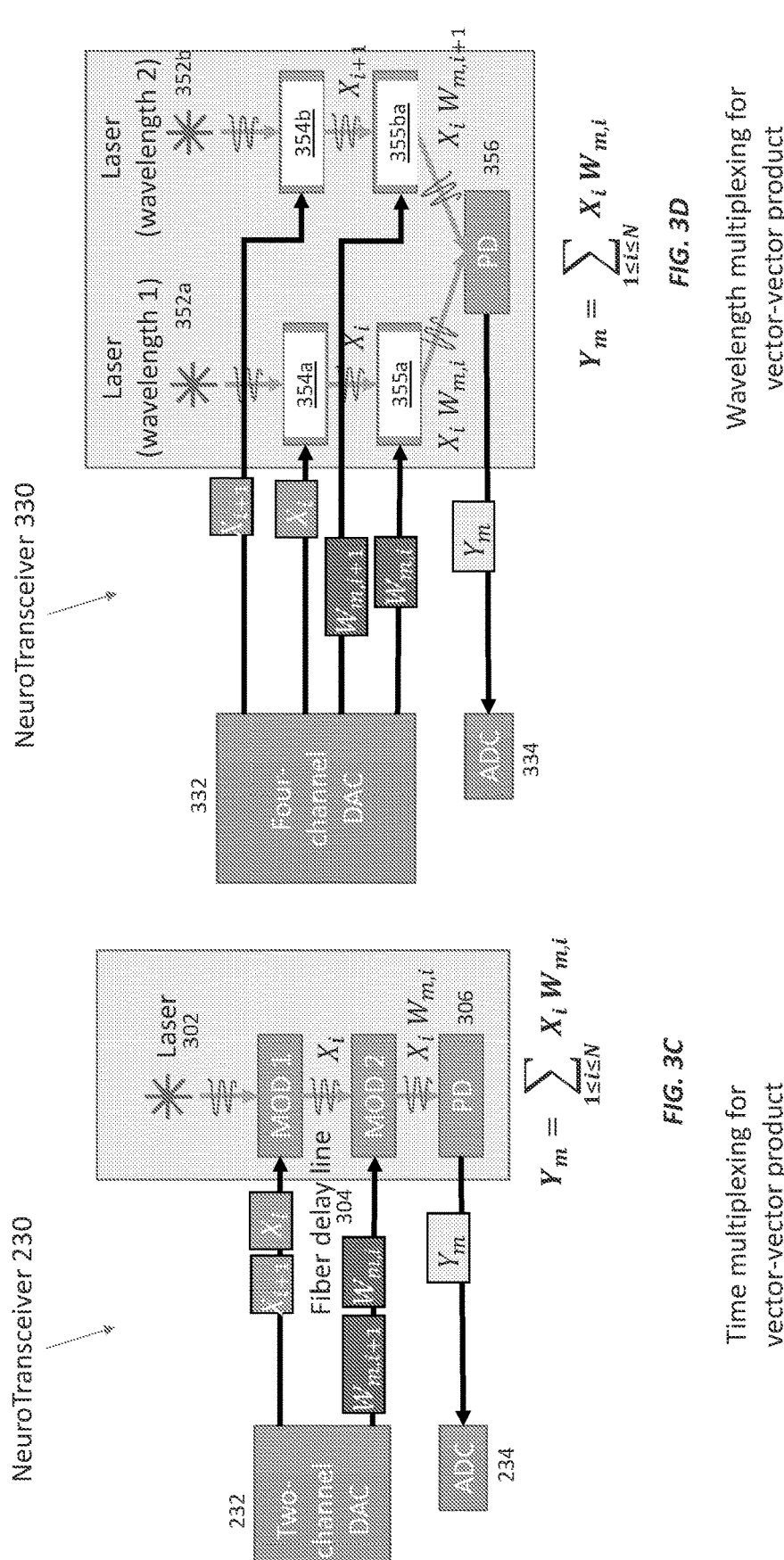
FIG. 3C illustrates the NeuroTransceiver of FIG. 3A performing time-division-multiplexed vector-vector dot products (linear transformations).
FIG. 3D illustrates a NeuroTransceiver configured to perform wavelength-division-multiplexed vector-vector dot products (linear transformations).

Linear algebra computations can be done in the optical domain very efficiently with the photoelectric effect under time and/or wavelength division multiplexing as in FIGS. 3C and 3D, respectively. Compared with electrical computing systems that carry out computation with binary logic electrical circuits with complementary metal-oxide-semiconductor (CMOS) logic, optics have energy and throughput advantages because the computation is done in analog domain using photons and hence can be easily parallelized. IOI leverages this strength by performing the matrix multiplication in the optical domain with the ONN unit instead of in the electrical domain.

As shown in FIGS. 3A and 3C, an N-sized vector-vector product $y_m = \Sigma_{1 \leq i \leq N} x_i w_{m,i}$ can be computed by encoding $X = [x_i]$ and $W = [w_i]$ vectors in T time steps and W channels (e.g., wavelengths) such that N=TW. In this way, the product of $x_i$ and $w_i$ can be accumulated over N units at a photodetector leveraging the photoelectric effect to get the vector-vector product $y_m$.

FIG. 3D illustrates a NeuroTransceiver 330 configured for wavelength-division multiplexed vector-vector product computations. This NeuroTransceiver 330 encodes X and W vectors onto two wavelength channels (bins) but could be extended to more wavelengths with additional lasers and modulators. It includes a four-channel DAC 332 that receives packets with input activation and weight vectors and encodes odd- and even-indexed elements in the vectors onto a first and second wavelength channels, respectively. The odd-indexed input activation and weight vector elements drive a first modulator 354a and a second modulator 355a, respectively, which modulate a first optical carrier at wavelength 1 from a first laser 352a as described above. Similarly, the even-indexed input activation and weight vector elements drive a first modulator 354b and a second modulator 355b, respectively, which modulate a second optical carrier at wavelength 2 from a second laser 352b. (The NeuroTransceiver 330 can also include optical delay lines that connect the first and second modulators as in FIGS. 3A and 3C.) A single broadband photodetector 356 detects (and sums) the outputs from modulators 355a and 355b, generating a photocurrent or other electrical signal that is digitized by an ADC 334.

Hybrid time/wavelength multiplexing. Optical matrix multiplication can be done in either the time domain or the frequency domain with the same system throughput because the time and frequency domains are exchangeable in the Fourier space. Time-division multiplexing involves fewer optical devices (modulators, photodetectors) but serializes the entire vector in time so that the computation time is longer. Frequency-division multiplexing allows encoding on parallel wavelength channels at the same time so that the integration happens in the frequency domain in potentially fewer time steps at the cost of more optical devices operating in parallel. For a vector product computation, having W parallel channels reduces the total computation time by a factor of W.

Handling frequency differences between the modulator and photodetector. Due to the T-step time integration, the operating speeds of modulators and photodetector in the system of FIG. 3A are different. While both modulators work at the frequency of M, the photodetector operates at a reduced frequency of M/T to perform a T-step time integration.

This effect also agrees with the nature of vector-vector products: the volume of input data (two vectors each with multiple values) tends to be much larger than the volume of output data (a single value). Hence, the ONN hardware's input data rate for is much higher than its output data rate. This creates a rate-mismatch issue for line rate processing. To resolve this issue, a memory module coupled the ADC output stores the output vector elements $y_m$ from the photodetector (refer to FIG. 3A). As soon as the entire activation vector $Y = [y_m]$ has been calculated by the ONN hardware, this memory module flushes the entire Y vector into the programmable packet switch at the line rate for nonlinear activation processing and starts the computation of the products for the next layer of the neural network. The size of the memory should be sufficient for storing the inter-layer activation vector, which would be equivalent to the number of neurons of in the largest layer of the neural network.

Synchronizing modulators inputs with weight pickup and fiber delay line. For a vector-vector product $\Sigma_{1 \leq i \leq N} x_i w_{m,i}$ on IOI, one challenge is to synchronize $x_i$ and $w_{m,i}$ so that the coded waveforms reach the second modulator at the same time. IOI tackles this challenge by encapsulating $x_i$ and $w_{m,i}$ into the same packet using the programmable packet switch and feeding this packet into the DAC 232 so that the analog values of $x_i$ and $w_{m,i}$ arrive at the second modulator MOD 2 (FIG. 3A) at precisely the same time. The fiber delay line 304 connects the modulators MOD 1 and MOD 2 with a delay equal to the duration of $x_i$. This delay accounts for the time that it takes the first modulator MODI to modulate $x_i$ onto the optical wave (laser pulse) and ensures that the optical wave modulated with $x_i$ and voltage waveform modulated with $w_{m,i}$ arrive at the second modulator MOD 2 at precisely the same time.

Performance. For one ONN hardware unit 300 (e.g., with two modulators MOD 1 and 2 and one photodetector 306 as shown in FIG. 3A) with a 100 Gb/s line rate carrying $x_i$ and $w_{m,i}$, a d-bit DAC 232 drives a (100/2 d) GS/s modulator operating speed. After a T-step time integration, the photodetector speed is (100/2 dT) GS/s. At this rate, it takes (2 dTM/100) nanoseconds to calculate an M-element output vector of this neural layer with one ONN hardware unit 300.

Electrical Nonlinear Activation at Programmable Switches

Nonlinear computation is challenging at the optical domain. Fortunately, nonlinear operations are simple and easy at the electrical domain. For example, the rectified linear unit (ReLU) function, a nonlinear activation function widely used in neural networks, can be interpreted into match-action tables as following:

$$ReLU(x) = \begin{cases} \text{null action,} & x \cdot \text{sign} = 1 \\ \text{all bits set to zero,} & x \cdot \text{sign} = 0 \end{cases} \quad (1)$$

These match-action tables can be stored in the register 226a in the first stage of the two-stage pipeline 222 in the programmable packet processing chip 220.

ReLU on a pipeline or other logic in a programmable packet switch. In IOI, the nonlinear activation function is implemented inside the programmable packet switch pipeline 222 with match-action logic (e.g., using P4 language in an appropriately modified Intel Tofino 2 switch as depicted in FIG. 3B). The binary form of a 32-bit or 16-bit floating number is coded as three parts: sign (1 bit), exponent (5 bits or 8 bits), and mantissa (10 bits or 23 bits). Hence, the ReLU function can be implemented on the Intel Tofino switch using the P4 language to describe the match-action as follows: for incoming data x, perform a "null" action if x's "sign" bit matches 1 or a "set-to-zero" action if x's "sign" bit matches 0 as indicated above in Eq. (1).

Neuro-Packets. To use the programmable packet processing chip 220 for machine learning inference, the structure of the packets 201 sent to the NeuroTransceiver 230 should be designed carefully because the switch's pipeline architecture 222 processes the packet metadata rather than the packet payload. As discussed above, to perform matrix multiplication while synchronizing the arrivals of the input vector element and weight at the ONN hardware 300, the programmable packet processing chip 220 encapsulates the input vector element and weight into the same packet 201.

Figure 4A:
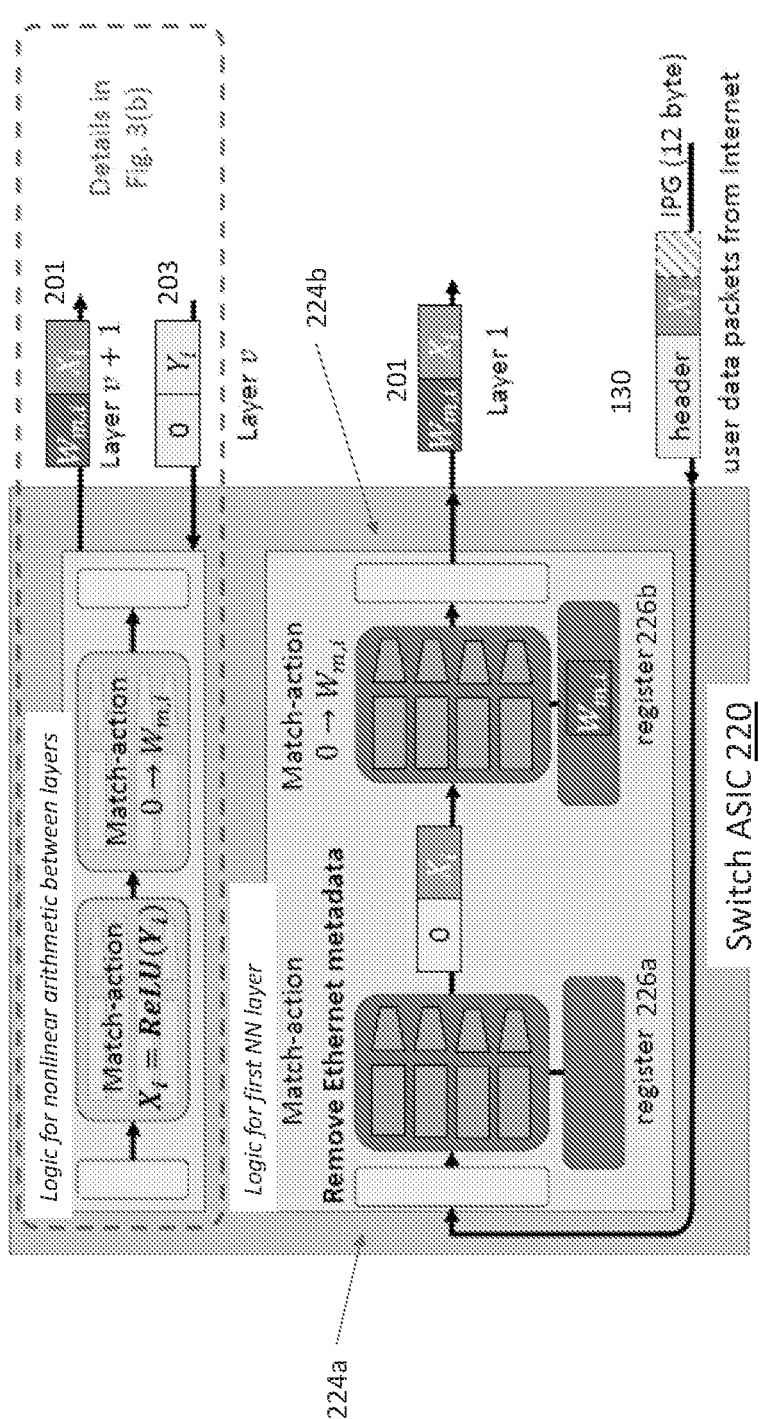
FIG. 4A illustrates packet processing for incoming data packets in an IOI system.

FIG. 4A shows the programmable logic for routing and processing Neuro-packets with the programmable packet processing chip 220 (e.g., a Tofino chip or Junos Trios chipset). The programmable packet processing chip 220 receives packets 130, also called public Neuro-packets, with inference data 13 from users 11 for IOI processing. These packets 130 also contain Ethernet/Internet Protocol (IP) information so that they can be routed to one or more designated programmable switches 200 instead of to host servers. Each programmable packet processing chip 220 removes this routing information in the packet headers and replaces it with the corresponding weight $w_{m,i}$ used for matrix multiplication by the ONN unit 300 in the NeuroTransceiver 230 coupled to the programmable packet processing chip 220. The programmable packet processing chip 220 may store the routing information removed from the packet headers in the register 226a for sending the output back to the source of the input data 13 (the user's client device). This packet 201, with an input vector element and weight for IOI processing, is called a private Neuro-packet.

Figure 4B:
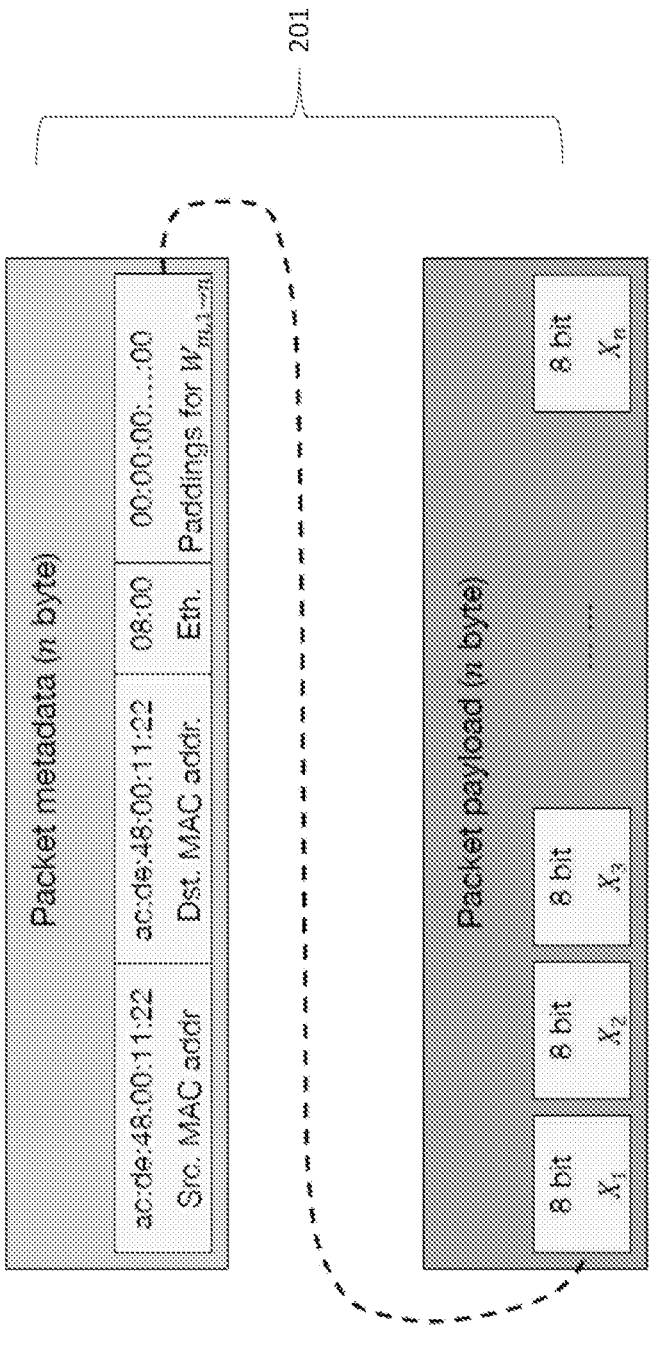
FIG. 4B illustrates a packet format for IOI processing.

FIG. 4B shows the structure of a typical private Neuro-packet 201. It includes n bytes of metadata and n bytes of payload. The metadata includes the media access controller (MAC) addresses of the packet source and destination (possibly the same, as in FIG. 4B), Ethernet/Internet Protocol (IP) information, and a zero-padded portion that is reserved for the weights $w_{m,i}$. The payload contains the elements of the input vector $x_i$, with eight bits per element. Because both $x_i$ and $w_{m,i}$ are processed by the programmable packet processing chip 220, they are coded as packet headers in Neuro-packets 201 with empty payloads.

In the Neuro-packet 201, the size of packet metadata is equal to the size of payload, regardless of the Ethernet/IP information size (typically n=14 bytes; the rest is padded with zeros as shown in FIG. 4B). In this example, the packet metadata and payload are the same size so that the packet can an equal number of weights and inputs for multiplication. A Neuro-packet 201 can be as large as 1500 bytes, so it can encapsulate an input vector with maximum size of 750 bytes (coded as 8-bit integers) into the same packet, with the actual Neuro-packet size depending on the maximum number of weights per pass through the programmable packet processing chip 220.

As mentioned above, there are two variants of Neuro-packets: (1) public Neuro-packets 130 and (2) private Neuro-packets 201. The differences between public and private Neuro-packets depend on their sources and destinations. A public Neuro-packet 130 is a data packet between a user client and IOI that is routed via the public internet 20: its metadata part is coded as a packet header carrying IP/Ethernet routing information and zero paddings, and its payload part is coded as a packet payload that carries user input data 13 or final inference results. A private Neuro-packet 201 is a data packet that circulates within the programmable switch 22 (between the programmable packet processing chip 220 and NeuroTransceiver 230) and carries activation vectors between layers of the neural network.

Referring again to FIG. 4A, the first stage 224a of the programmable switch logic in the programmable packet processing chip 220 sets the entire metadata area (marked "Header") of an incoming Neuro-packet 201 to be zero. The second stage 224b of the programmable switch logic inserts the corresponding weight for the first layer of the neural network into the Neuro-packet 201 and sends the Neuro-packet 201 to the ONN unit 300 (FIG. 3A) for optical vector-vector multiplication. After first layer, the programmable packet processing chip 220 follows the packet recirculation logic shown in FIGS. 3A and 3B, with the Neuro-packet 201 circulating between the ONN unit 300 and the programmable packet processing chip 220 until it reaches the last layer of the neural network 15, at which point the Neuro-packet 201 is sent to its destination using the routing information stripped from the incoming packet 130 and stored in switch memory (e.g., in register 226a).

Performance. Though the memory 236 in the NeuroTransceiver 230 flushes data into the programmable packet processing chip 220 at a 100 Gb/s line rate, the Neuro-packet 201 can be formatted so that it can "pick up" the weights of the next neural layer through the match-action logic inside the programmable packet processing chip 220 as depicted in FIG. 3B. The packet that goes into the programmable packet processing chip 220 contains an empty section (size equivalent to the size of the weight). For a d-bit ADC 234 in the NeuroTransceiver 230, the amount of fixed-length data that goes into the switch is (100/2d) GS/s. (This is also the speed of nonlinear function inside the programmable packet processing chip 220.) Because weights are picked up along the processing pipeline 222, the programmable packet processing ASIC's output data rate is still 100 Gb/s, but with (100/d) GS/s because the Neuro-packets 201 in the data stream contain both inference data (inputs) $x_i$ and weights $w_{m,i}$. This data rate matches the input data rate of the ONN unit 300 and hence starts the next layer of neural network computation. It takes (2 dM/100) nanoseconds for the programmable packet processing chip 220 to provide nonlinear (e.g., ReLU) activation for an M-size vector coming from one unit of ONN hardware 300 at a 100 Gb/s line rate.

Computing Multiple Neural Layers with Recirculation

The ONN hardware 300 and programmable packet processing chip 220 perform matrix multiplication and nonlinear activation for one neural layer. To execute a neural network with multiple layers, the ONN hardware and programmable packet switch pass recirculate Neuro-packets among layers, with each Neuro-packet carrying activation vectors as the input of the next neural network layer. The ONN hardware and programmable packet switch are provisioned for the largest layer in the neural network (the layer with the most neurons). Considering both optical matrix multiplication and electrical nonlinear activation, the IOI total computation delay for an l-layer neural network with an M-size output vector and is 2dlM(T+1)/100 nanoseconds.

IOI Client and Protocol

Figures 5A, 5B:
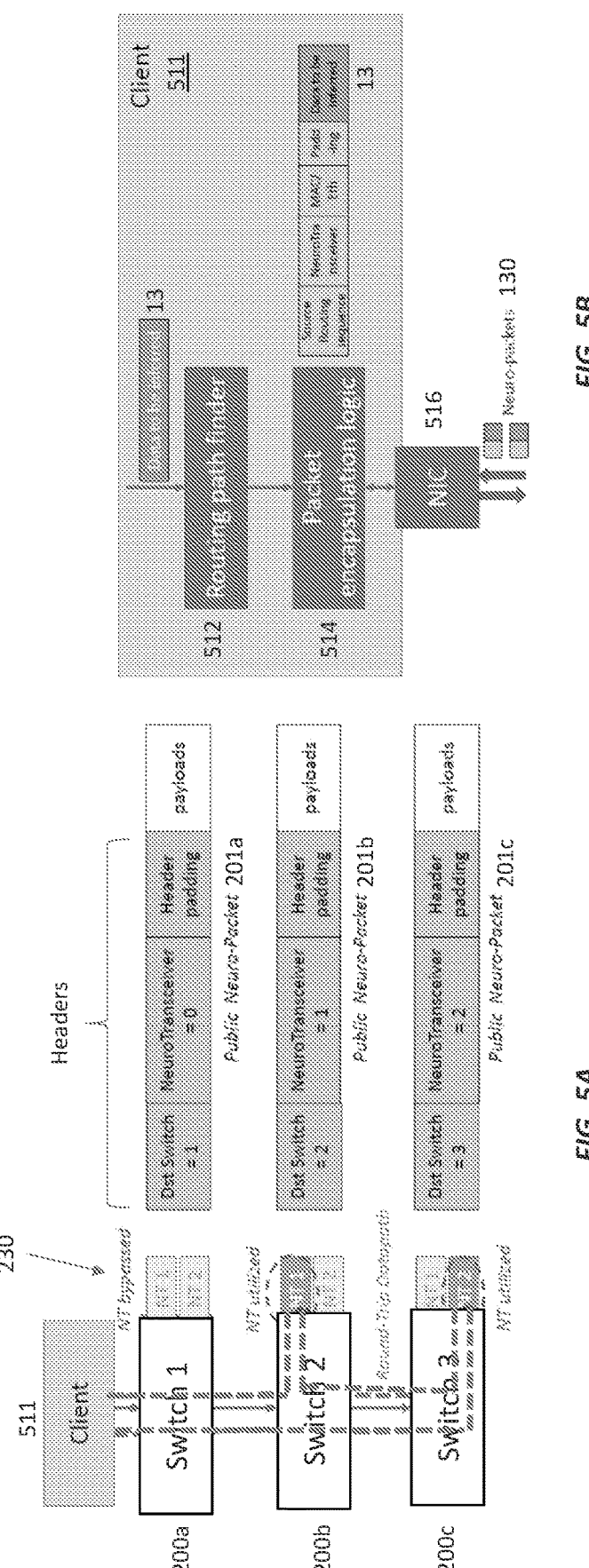
FIG. 5A illustrates a routing and packet encapsulation protocol of Neuro-packets in an IOI system with cascaded switches and NeuroTransceivers.
FIG. 5B shows an IOI client with a routing path finder process and packet encapsulation logic.

FIG. 5A illustrates a protocol for routing public Neuro-packets (right) from a client 511 (top left) to one or more different IOI programmable packet switches 200a-200c. Each programmable packet switch 200 has its own IP address. The Neuro-packets 201 encode these IP address as destination addresses in their headers. IOI leverages segment routing because different switches 200 may store different machine-learning models 15, so each Neuro-packet 201 should be processed at its destination switch (e.g., switch 200c) while bypassing intermediate switches (e.g., switches 200a and 200b). If a neural network 15 is too large to fit into a single switch 200, its layers can be distributed among multiple switches 200 as a chain, with segment routing between links in the chain to force the Neuro-packet 201 to traverse these switches in a designated order.

The IOI routing protocol enables routing of Neuro-packets 201a-201c between user clients 511 and programmable packet switches 200. The IOI routing protocol is a layer-3 protocol that ensures the accurate routing between clients 511 and destination IOI while bypassing intermediate switches 200 ("NT bypassed" in FIG. 5A), even though they may also be equipped with IOI and accept IOI protocol Neuro-packets 201. For example, in FIG. 5A, programmable packet switch 200a operates as a regular switch, even it is equipped with pluggable NeuroTransceivers 230, while programmable packet switches 200b and 200c perform neural network processing using the techniques described here. Each programmable packet switch 200 may include one or more NeuroTransceivers 230 ("NTs" in FIG. 5A), with the header for each Neuro-packet 201 done by the client 511 and designating which NeuroTransceiver 230 to use, if any, at each switch 200 under the IOI routing protocol. In FIG. 5A, each switch includes NeuroTransceivers (NTs) 1 and 2, with NT 1 executed at switch 200b on the middle Neuro-packet 201b and NT 2 executed at switch 200c on the bottom Neuro-packet 201c.

FIG. 5B shows the architecture of the client 511 (e.g., a desktop computer, laptop computer, smartphone, or tablet) implementing the IOI routing protocol. The client 511 implements the IOI routing protocol so that when a user initiates a machine-learning inference task using IOI, the input data can be accurately encapsulated into the Neuro-packet format. For the segment routing paradigm, the IOI client 511 also contains a routing path finder module 512 that calculates the routing path among programmable packet switches (e.g., the switches 200a-200c in FIG. 5A) and selects the chain of switches that can finish the machine-learning inference task. The routing path finder module 512 can be implemented in software. Packet encapsulation logic 514 encodes the output of the routing path finder module 512 into the packet headers for guiding the Neuro-packets 201 to their designated programmable packet switches 200 and transceivers 220 via a network interface circuit (NIC) 516. The packet encapsulation logic 514 can be implemented on a computer operating system in a software stack or by programming the programmable switch using P4. The client 511 can be light-weight and can operate without performing complex operations. The IOI protocol and the routing can be directly implemented on the top of the client's operating system.

Theoretical Performance Analysis

Next, consider theoretical end-to-end latency and energy consumption for bulk machine-learning inference tasks generated by different users and performed at the same programmable packet switch. These inference tasks are in the same class and are carried by F different flows with flow sizes of B bytes each, with the F flows arriving and being processed simultaneously. The size of the machine learning model is H bytes.

The end-to-end latency comes mainly from packet processing delay and inference computation delay. IOI's in-network computing architecture can reduce the packet processing delay to sub-round-trip time (RTT) levels for high-speed packet flows with respect to server-based inference processing. To see why, consider a state-of-the-art CPU versus a state-of-the-art programmable packet switch. An Intel Tofino programmable packet switch has a packet processing speed of 6 GPPS (12.8 Tb/s), which is over 1000 times faster than a 5.2 MPPS core in a 2.1 GHZ Xeon Gold 6152 CPU (for a generic Ethernet packet with 1500 byte, 5.2 MPPS translates to 60 Gb/s data speed.). This speed advantage comes from the fact that programmable packet switch can process data at line rate as data goes through the pipeline, while a server uses a CPU for packet processing at a reduced rate constrained by the CPU frequency.

Switches have lower inference computation delays than processors as well. For example, an NVIDIA A100 GPU has a computation speed at INT8 accuracy of 624 TOPS. In an IOI system, on the other hand, inference processing can run at a line rate of $2dM(T+1)/100$ nanoseconds for a neural layer with an M-size output vector (discussed above).

Using these results, consider a scenario where 128 flows of inference tasks (each with 10 MB flow size) is accessing a cloud data center for a 300 MB machine learning model with L layers. In this scenario, an NVIDIA A100 GPU server takes 28.45 ms for packet processing and 0.13 ms for inference computation for an end-to-end latency of 28.58 ms). For IOI with a programmable packet switch with 100 ports and 50 wavelengths (C=50), the packet processing delay is 0.8 ms and the inference computation delay is 0.96 ms for an end-to-end latency of 1.76 ms. This is 16 times shorter than the end-to-end latency on the A100 server, even without considering the propagation delay difference (200 km/ms).

TABLE 1

End-to-end latency analysis.

| | Packet Processing Delay | Inference Delay |
|---|---|---|
| A100 GPU Server | 8 BF/60 × 6 ns | 2 HF OP/624 TOPS = HF/312 ps |
| IOI | 8 BF/12800 ns | 2 × 8 HF bit/12800 C Gbps = HF/800 C ns |

Energy Consumption

The energy consumption for an inference task comes from packet processing, memory read/write operations, and neural computations. IOI's optical matrix multiplication module consumes less energy than GPU-based matrix computation.

In a server using an NVIDIA A100 GPU, the power consumption for inference processing is about 400 W. To provide packet processing functionality, this GPU works with a CPU and four NICs, which consume 120 W and 80 W (20 W per NIC), respectively. Generally, a CPU's power consumption is 120 W, with 20 W consumed by a 100 Gb/s NIC. Much of the GPU's energy consumption comes from reading the data and weights from memory, which, in today's DRAM, incurs an energy cost of about 20 pJ per 8-bit memory read/write operation.

In IOI processing, the programmable packet switch, DAC/ADC, memory I/O, modulators, and lasers contribute to the system power consumption. The programmable packet switch can consume about 4.2 W per port. Driving the modulator may take less than 10 pJ/bit, and the photo-detector readout and ADC take less than 10 pJ per sample at 8-bit precision. The memory I/O has a power consumption of about 20 pJ per 8-bit operation. However, the entire weight does not need to be stored in (or read from) memory as in a GPU server, hence saving energy. For a 100 Gb/s line rate, the power consumption of the modulators and photo-detector is about $1/[2d(T+1)]$ W.

An NVIDIA A100 GPU server may consume a total of 610 W (including 140 W in packet processing, 400 W in neural computation, and 10 W in memory I/O). However, with IOI, the total power consumption falls to about 274 W (including 268 W for packet processing, 23 mW for infer-ence, and 5 W for accessing memory) Thus, IOI has sig-nificant energy advantages over GPU servers for inference processing. This advantage comes from the fact that IOI leverages optical computing with modulators and photode-tectors, which consume pW levels of power, while GPUs consume much more power. For an 8-bit DAC/ADC system, IOI can reduce power consumption by a factor of 2.2.

TABLE 2

Power consumption analysis.

| | Packet Processing Power | Inference Power | Memory Power |
|---|---|---|---|
| A100 GPU Server | 120 W (CPU) + 80 W (four NIC) | 400 W | ~10 W |
| IOI | 2.1 C W | $3 C/[2d(C + 1)]$ W = 0.18 C W | ~5 W |

Performance Advantages

For a 200 MB DLRM model with a 10 MB inference task, IOI can achieve a 16× shorter inference delay and 2.2× less energy consumption compared to an NVIDIA A100 GPU server solution at 0.34× the cost. These performance analy-ses are rough estimates with worst-case considerations. Further improvement could be achieved by carefully exam-ining the latency, energy consumption, and cost of each IOI component.

Resilience of Inference Accuracy Against Packet Loss with-out TCP

As analyzed above, one advantage that IOI provides is to override TCP overhead held by CPU and Linux kernels. However, the price of this advantage is the absence of TCP in packet transmission. Unlike server-based inference, where TCP guarantees reliable delivery of packets, Neuro-packets are delivered to programmable packet switches on the Ethernet layer without packet guarantees.

Standalone Modulators and Photodetectors with Program-mable Packet Switch

Figure 6:
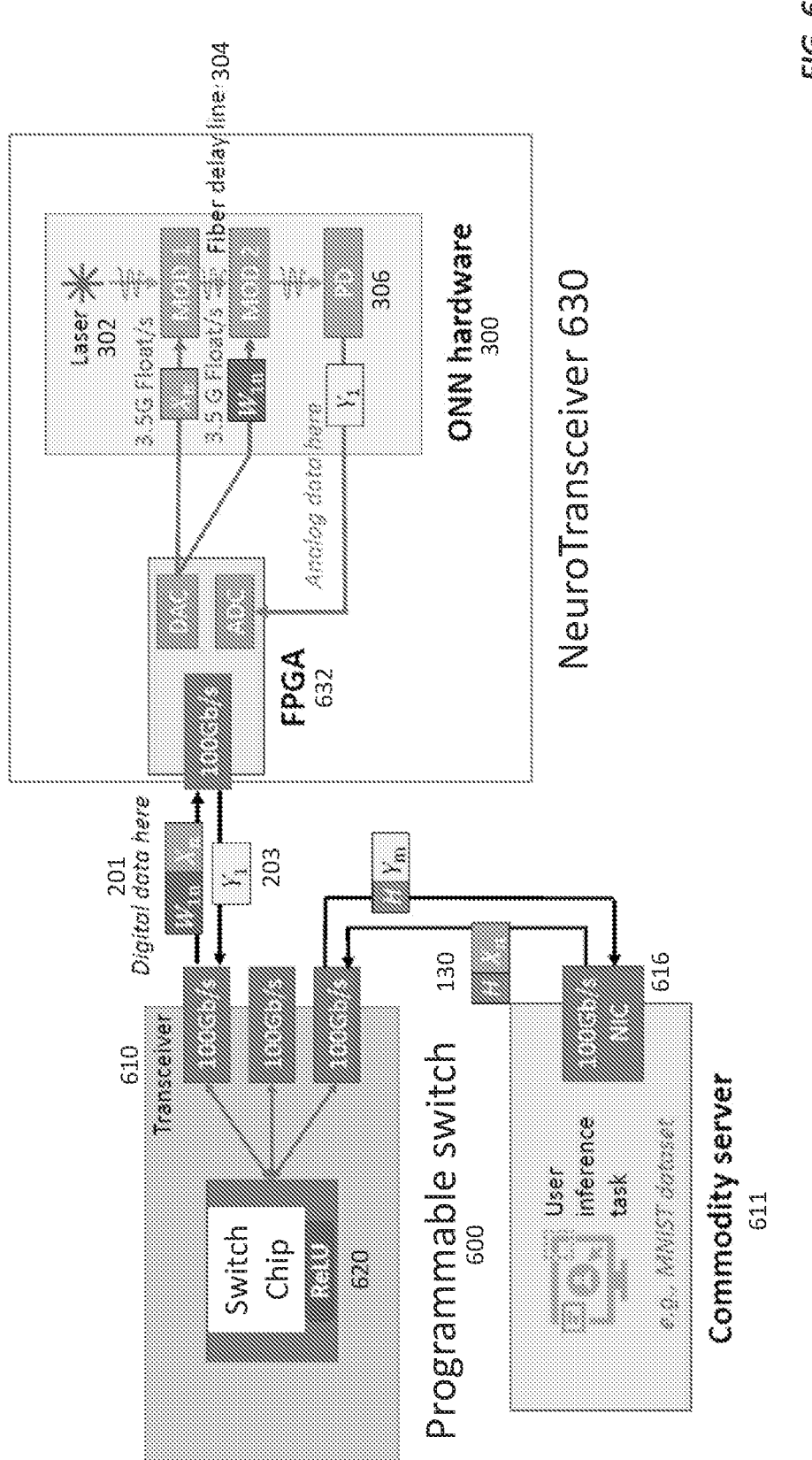
FIG. 6 shows an IOI testbed with a programmable packet switch, FPGA-based DAC/ADC, ONN hardware, and commodity server.

FIG. 6 shows a testbed NeuroTransceiver 630 using standalone optical devices and optical fiber connections. In this testbed, a programmable packet switch 600 is coupled to a field-programmable gate array (FPGA) 632, which serves as a high-speed DAC/ADC. Alternatively, the FPGA 632 can be omitted, and the DAC and ADC can be imple-mented as discrete components inside the NeuroTransceiver 630. The FPGA 632 connects the programmable packet switch 600 with the ONN hardware 300. In operation, transceivers 610 in the programmable packet switch 600 receive user inference task data as public Neuro-packets 130 with header data H and input vector data $X_n$, from a commodity server 611 via an NIC 616. A programmable packet processing chip 620 in the programmable packet switch 600 replaces the header data with weights $W_{1n}$ to yield private Neuro-packets 201, then circulates the private Neuro-packets 201 and output packets 203 with the ONN hardware 300 via the FPGA 632 to produce an output $Y_m$, which the programmable packet switch 600 sends back to the commodity server 611.

Co-Packaged On-Chip Frequency Comb with Program-mable Packet Switch

Figure 7:
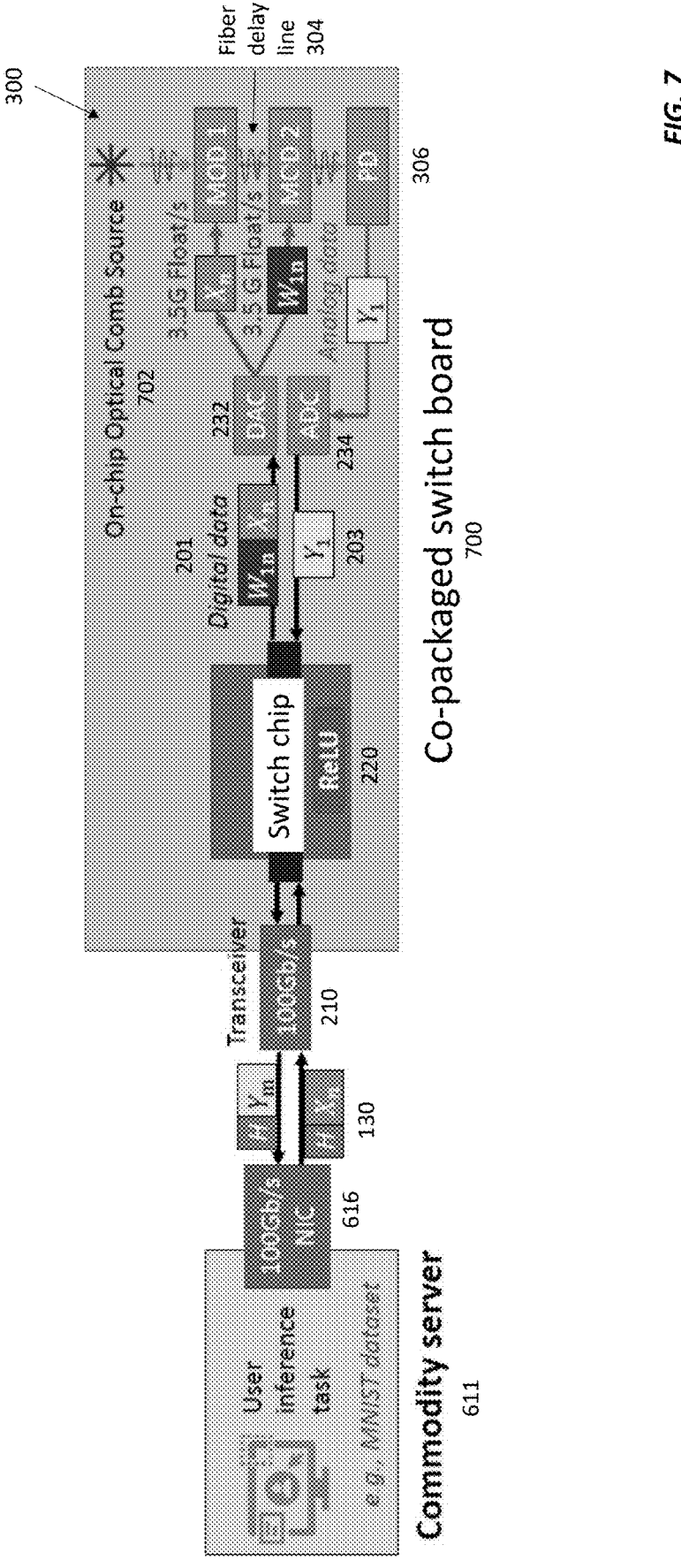
FIG. 7 shows IOI system with a co-packaged switch board with co-packaged transceivers.

FIG. 7 shows the programmable packet processing chip 220 (e.g., an Intel Tofino chip) and ONN hardware 300 co-packaged on the same switch board 700. As before, a commodity server 611 with a 100 Gb/s NIC 616 provides public Neuro-packets 130 to a transceiver 210 plugged into the switch board 700. The programmable packet processing chip 220 turns the public Neuro-packets 130 into private Neuro-packets 201 by replacing the headers with weights, then transmits the public Neuro-packets 130 to the two-channel DAC 232, which converts the inference data and weights into separate analog waveforms for driving the modulators MOD 1 and 2 as described above.

In this design, the optics are moved away from a plug-gable faceplate directly onto a PCB board using silicon photonic modulators, photodetectors, and frequency comb sources. More specifically, in this example, the optical source is an on-chip Kerr optical comb source (pulsed laser) 702. The comb source 702 drives the modulators MOD 1 and 2 with optical pulses that are modulated by analog forms of the input vector elements and weights, with a fiber delay line 304 delaying the modulated optical pulse(s) from modu-lator MOD 1 by a delay approximately equal to the duration of the analog waveform that drives modulator MOD 1. The photodetector 306 detects the modulated optical pulses emitted by modulator MOD 2, transducing them into analog photocurrents whose amplitudes represent the products $Y_i$ of the input data and the weights. The ADC 203 digitizes these products, which are returned to the programmable patch processing ASIC 220 in digital packets for nonlinear acti-vation and, if there are more layers of the neural network, recirculation to the optical hardware 300. When the pro-grammable patch processing ASIC 220 receives packets representing the output of the last layer of the neural network, it restores the header information to the packets, then transmits them back to the commodity server 611 or other destination.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exem-plary and that the actual parameters, dimensions, materials, and/or configurations will depend upon the specific appli-cation or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be prac-ticed otherwise than as specifically described and claimed. Inventive embodiments of the present disclosure are directed to each individual feature, system, article, material, kit, and/or method described herein. In addition, any combina-tion of two or more such features, systems, articles, mate-rials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of inference processing, the method comprising:
   transmitting a first data packet containing an input vector to a layer of neurons in an artificial neural network from a client to a programmable packet switch comprising a programmable packet processing chip and an optical computing unit;
   removing source and/or destination metadata from the first data packet;
   after removing the source and/or destination metadata from the first data packet, concatenating, by the programmable packet processing chip, a weight vector corresponding to the layer of neurons with the first data packet;
   transmitting the first data packet and the weight vector from the programmable packet processing chip to the optical computing unit;
   computing a product of the input vector and the weight vector with the optical computing unit;
   transmitting a second data packet containing the product of the input vector and the weight vector from the optical computing unit to the programmable packet processing chip; and
   applying a nonlinear activation function to the product with the programmable packet processing chip.

2. The method of claim 1, further comprising:
   storing the destination metadata in a memory while computing the product of the input vector and the weight vector and applying the nonlinear activation function;
   adding the destination metadata to an output packet containing an output of the artificial neural network; and
   transmitting the output packet from the programmable packet switch to a destination specified in the destination metadata.

3. The method of claim 1, wherein applying the nonlinear activation function comprises retrieving information from a match-action table programmed into a memory of the programmable packet processing chip.

4. The method of claim 1, wherein the layer of neurons is a first layer of neurons of the artificial neural network, the weight vector is a first weight vector, and further comprising:
   concatenating, by the programmable packet processing chip, a second weight vector corresponding to a second layer of neurons in the artificial neural network to the second data packet; and transmitting the second data packet and the second weight vector from the programmable packet processing chip to the optical computing unit.

5. The method of claim 1, further comprising, before transmitting the second data packet:

digitizing the product of the input vector and the weight vector; and storing the product in a memory.

6. A method of inference processing, the method comprising:

transmitting a first data packet containing an input vector to a layer of neurons in an artificial neural network from a client to a programmable packet switch comprising a programmable packet processing chip and an optical computing unit;

concatenating, by the programmable packet processing chip, a weight vector corresponding to the layer of neurons with the first data packet;

transmitting the first data packet and the weight vector from the programmable packet processing chip to the optical computing unit;

computing a product of the input vector and the weight vector with the optical computing unit;

transmitting a second data packet containing the product of the input vector and the weight vector from the optical computing unit to the programmable packet processing chip; and applying a nonlinear activation function to the product with the programmable packet processing chip, wherein computing the product of the input vector and the weight vector comprises:

modulating, with a first modulator, an optical pulse with a waveform proportional to the input vector;

modulating, with a second modulator in optical communication with the first modulator, the optical pulse with a waveform proportional to the weight vector; and detecting the optical pulse with a photodetector in optical communication with the second modulator.

7. The method of claim 6, further comprising:

delaying the optical pulse between the first modulator and the second modulator by a delay equal to a duration of the waveform proportional to the input vector.

8. A programmable packet switch comprising:

a programmable packet processing chip to concatenate a first data packet representing an input vector to a first layer of neurons of an artificial neural network with a first weight vector corresponding to the first layer of neurons; and an optical processor, operably coupled to the programmable packet processing chip, to receive the first data packet and the first weight vector from the programmable packet processing chip, to compute a product of the input vector and the first weight vector, and to transmit the product of the input vector and the first weight vector to the programmable packet processing chip as a second data packet, wherein the programmable packet processing chip is configured to remove source and/or destination metadata from the first data packet before transmitting the first data packet and the first weight vector to the optical processor.

9. The programmable packet switch of claim 8, wherein the programmable packet switch further comprises:

a memory to store the destination metadata while the optical processor computes the product of the input vector and the first weight vector, wherein the programmable packet processing chip is configured to add the destination metadata stored in the memory to an output packet containing an output of the artificial neural network.

10. The programmable packet switch of claim 8, wherein the programmable packet processing chip is configured to perform a nonlinear activation on the product of the input vector and the first weight vector, thereby producing an output of the first layer of neurons.

11. The programmable packet switch of claim 10, wherein the programmable packet processing chip comprises a memory to store a match-action table representing the nonlinear activation.

12. The programmable packet switch of claim 10, wherein the programmable packet processing chip is further configured to concatenate the output of the first layer of neurons with a second weight vector corresponding to a second layer of neurons of the artificial neural network and to transmit the output of the first layer of neurons and the second weight vector to the optical processor.

13. A programmable packet switch of claim 8 comprising:

a programmable packet processing chip to concatenate a first data packet representing an input vector to a first layer of neurons of an artificial neural network with a first weight vector corresponding to the first layer of neurons; and an optical processor, operably coupled to the programmable packet processing chip, to receive the first data packet and the first weight vector from the programmable packet processing chip, to compute a product of the input vector and the first weight vector, and to transmit the product of the input vector and the first weight vector to the programmable packet processing chip as a second data packet, wherein the optical processor comprises:

a first modulator to modulate an optical beam with a first analog waveform representing the input vector;

a second modulator, in optical communication with the first modulator, to modulate the optical beam with a second analog waveform representing the first weight vector; and a photodetector, in optical communication with the second modulator, to detect the optical beam.

14. The programmable packet switch of claim 13, further comprising:

at least one digital-to-analog converter, operably coupled to the first modulator and to the second modulator, to convert the input vector into the first analog waveform and to convert the first weight vector into the second analog waveform.

15. The programmable packet switch of claim 13, further comprising:

an analog-to-digital converter, operably coupled to the photodetector, to convert a photocurrent generated by the photodetector in response to detecting the optical beam into a digital signal representing the product of the input vector and the first weight vector.

16. The programmable packet switch of claim 13, wherein the optical processor further comprises:

an optical delay line, coupling the first modulator to the second modulator, to delay the optical beam by a delay equal to a duration of the first analog waveform.

17. A method of inference processing, the method comprising:

receiving a packet with a header comprising source/destination metadata and a payload comprising an input to a deep neural network (DNN);

removing the source/destination metadata from the header;

adding a weight vector corresponding to a first layer of the DNN to the header;

transmitting the packet to an optical processor comprising a first modulator, a second modulator in series with the first modulator, and a photodetector;

converting the input to the DNN into a first analog waveform;

converting the weight vector into a second analog waveform;

modulating, by the first modulator, an amplitude of an optical beam with the first analog waveform;

modulating, by the second modulator, the amplitude of the optical beam with the second analog waveform;

transducing, by the photodetector, the optical beam into an electrical signal with an amplitude representing a product of the input to the DNN and the weight vector; and performing a nonlinear activation on the electrical signal to produce an output of the first layer of the DNN.

18. The method of claim 17, further comprising:

transmitting a packet containing the output of the first layer of the DNN and a weight vector corresponding to a second layer of the DNN to the header to the optical processor.

* * * * *